Oct. 9, 1962  R. W. FRITTS  3,057,939
SELF-ALINING ARCUATE THERMOELEMENTS
Filed June 14, 1960  2 Sheets-Sheet 1

INVENTOR
ROBERT W. FRITTS
BY
Carpenter Abbott
Coulter & Kinney
ATTORNEYS

Oct. 9, 1962 R. W. FRITTS 3,057,939
SELF-ALINING ARCUATE THERMOELEMENTS
Filed June 14, 1960 2 Sheets-Sheet 2

INVENTOR
ROBERT W. FRITTS
BY
Carpenter Abbott Coulter & Kinney
ATTORNEYS

United States Patent Office 3,057,939
Patented Oct. 9, 1962

3,057,939
SELF-ALINING ARCUATE THERMOELEMENTS
Robert W. Fritts, Arden Hills, Minn., assignor to Minnesota Mining and Manufacturing Company, St. Paul, Minn., a corporation of Delaware
Filed June 14, 1960, Ser. No. 36,022
12 Claims. (Cl. 136—4)

This invention relates to improvements in thermoelectric generators.

Developments in the field of thermoelectric generators with the advent of more efficient materials have been mostly in the direction of structures which efficiently produce relatively high rates of power generation from various heat sources. Little attention has been paid to the possibility of achieving relatively large power output by the use of a structure in which the heat flux through the thermo-elements is maximized.

The present invention contemplates such a large power output thermoelectric generator, and achieves extreme compactness by the use of a novel structure in which an array of thermocouples including self-alining arcuate thermoelements is disposed around and conforms to the shape of one side of a conduit adapted to have a heat transfer medium pumped therethrough. The parts of the improved generator structure are so oriented that it is adapted for operation in the hottest portion of the flame of a gas burner of conventional type and under conditions usually found in the combustion chamber of a space heater or furnace. In the improved generator structure the thermoelements and associated parts are held in operative relation by means including biasing means cooperable with heat conductive force transmitting and thermojunction members to place said thermoelements under continuous compression and provide efficient heat flow from said thermoelements to the heat transfer medium. The improved generator can be easily fabricated by the use of mass production techniques and is enclosed within an hermetically sealed enclosure to insure long field life.

The invention can be readily understood by reference to the accompanying drawings in which.

Figure 2:
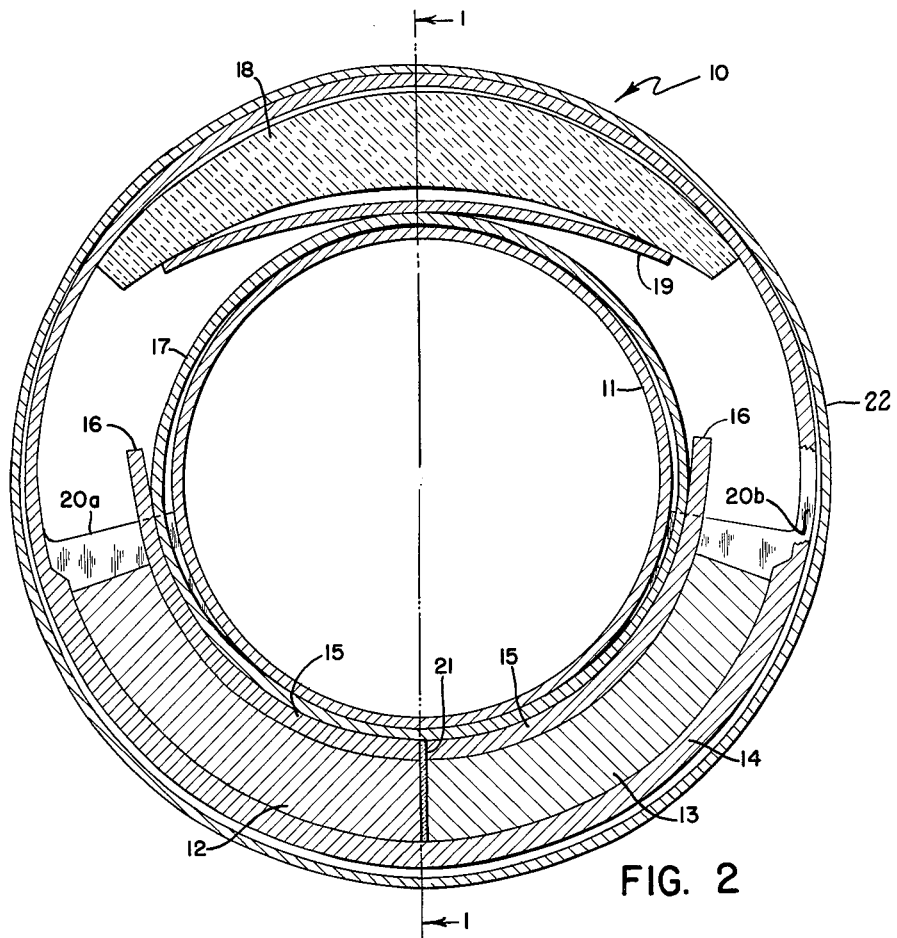
FIGURE 2 is a transverse vertical sectional view taken along the line II—II of FIGURES 1 and 4.

Referring more particularly to the drawings, the form of the improved generator assembly selected for illustration therein is indicated generally by the numeral 10 and comprises a metal conduit or tube 11 with arcuate walls, for example of copper or stainless steel. Mounted on the conduit 11 are a plurality of thermocouples in side-by-side relation each comprising an arcuate P-type thermoelement 12 and a similarly shaped N-type thermoelement 13. The thermoelements 12 and 13 of each thermocouple are in end-to-end relation in substantially the same plane normal to the axis of the tube 11, conforming to and disposed around the lower portion of said tube as shown most clearly in FIGURE 2. The thermoelements 12 and 13 of each couple are electrically joined by thermojunction means in the form of an annular thermojunction and force transmitting member 14, preferably of high conductivity iron alloy. The members 14 may be of the same width as the thermoelements, and the portions thereof in contact with said thermoelements may be thickened in cross section as shown in FIGURE 2. The arcuate outer surfaces of the thermoelements 12 and 13 engage the inner surface of the associated member 14 with either a pressure or a bonded type contact.

Figure 1:
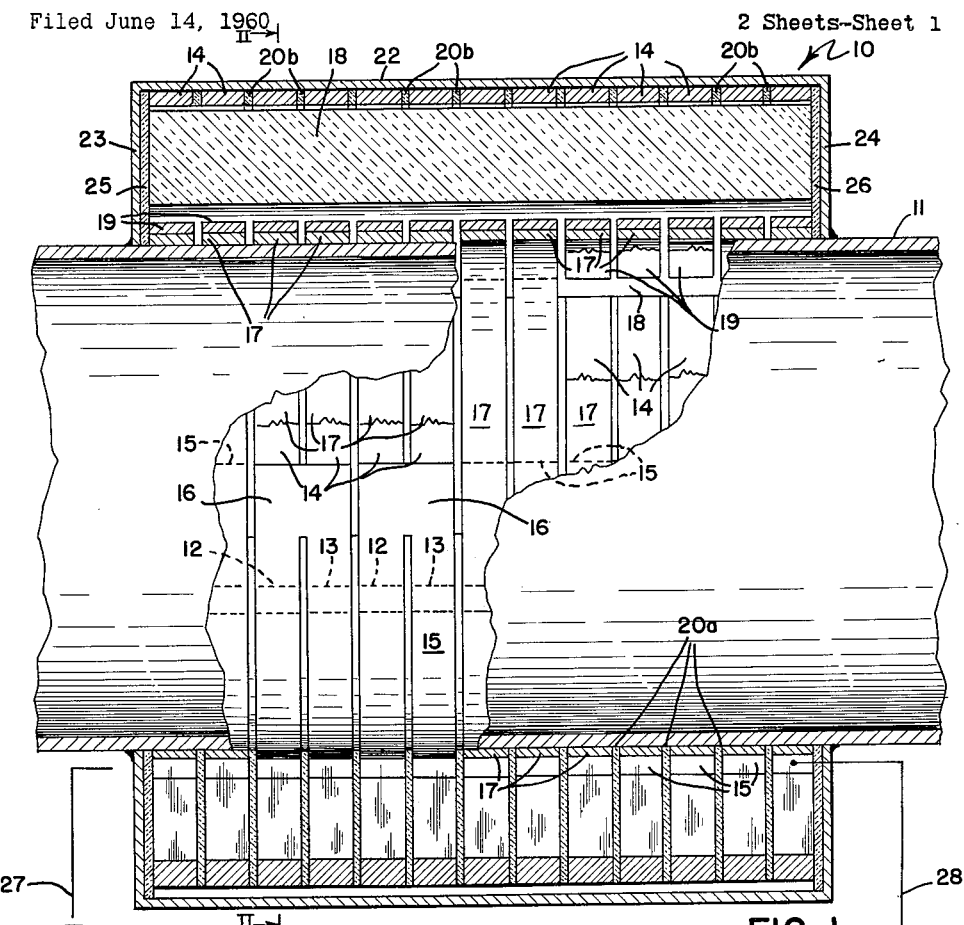
FIGURE 1 is an axial sectional view through a thermoelectric generator constructed in accordance with the principles of the invention, said view being taken along the line I—I of FIGURE 2, and parts being broken away.
Figure 3:
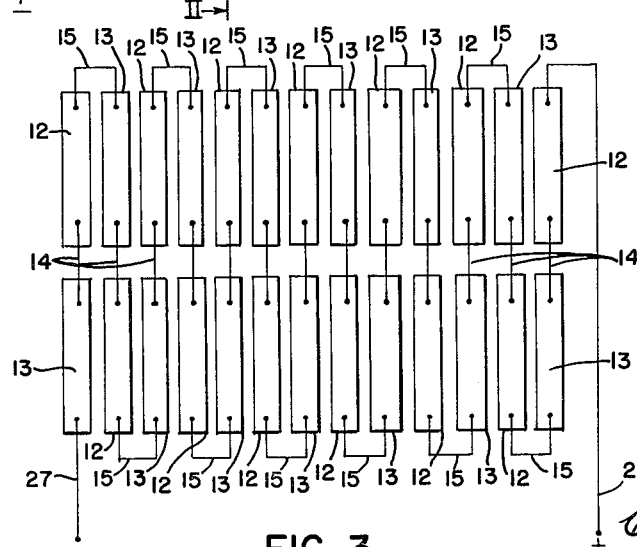
FIGURE 3 is a semi-diagrammatic view showing the electrical circuit of the generator shown in FIGURES 1 and 2.

As shown schematically in FIGURE 3, correspondingly positioned thermoelements of adjacent thermocouples are of the opposite conductivity type, i.e. P and N types. The thermocouples are connected in series circuit relation by thermojunction means comprising U-shaped thermojunction members 15 each having a pair of spaced legs overlaying and electrically joined to the arcuate inner surface of one of a pair of correspondingly positioned adjacent thermoelements as shown most clearly in FIGURE 1. The members 15 may be of soft copper, and the junctions thereof with the associated thermoelements are preferably, but not necessarily, of the soldered type. The legs of each member 15 are connected by a re-entrant portion 16 which extends circumferentially well beyond the outer ends of the associated thermoelements as shown in FIGURES 1 and 2 for the purpose which will hereinafter appear. In the operation of the improved generator, the members 14 function as hot thermojunction electrodes and the members 15 function as cold thermojunction electrodes, and it is apparent from FIGURE 3 that the members 14 and 15 connect all of the thermoelements 12 and 13 in series circuit relation to form a thermopile.

In order to insure proper heat flow from the members 14 through the thermoelements to a heat transfer medium within the tube 11, and at the same time to insure proper electrical connections of said thermoelements with the associated thermojunction members, heat transfer and biasing means is provided which produces radial compression of the thermoelements between the hot and cold thermojunction members joined thereto. To this end there is associated with each thermocouple a resilient ring member 17 surrounding and of somewhat larger diameter than the tube 11. The members 17 are preferably formed of spring steel and bear an electrically insulating surface coating, for example a coating of an oxide thereof. The members 17 may be of the same width as the thermoelements, the rings 14 and the legs of the members 15, each of the members 17 being disposed in substantially the same plane as its associated thermocouple and interposed between the tube 11 and the legs of the members 15 forming the cold thermojunction means for said thermocouple. Extending axially along the inner surface of the annular members 14 above the tube 11 is an insulating bushing 18 which is generally crescent-shaped in transverse cross section as shown in FIGURE 2, said bushing preferably being made of high porosity ceramic. Interposed transversely between the bushing 18 and the annular spring members 17 is biasing means which preferably takes the form of a plurality of leaves 19 of spring steel.

The springs 19 are deformed into the arcuate shape shown most clearly in FIGURE 2 and bias the bushing 18, and thereby the members 14, upwardly while at the same time biasing the annular spring members 17 downwardly. This causes the annular spring members 17 to be deformed into good thermal contact with the upper and the lower external surface of the tube 11 as shown in FIGURE 2. At the same time that the vertical diameter of the annular spring members 17 is reduced by such deformation, the horizontal diameter thereof is correspondingly increased to insure that the thermoelements are subjected to substantially uniform radial compression between the hot and cold thermojunction members in contact therewith, and also to maximize the area of thermal contact of the member 17 with the coacting legs of the cold thermojunction members 15. The annular spring members 17 thus deformed provide means for efficiently conducting heat from the cold thermojunction members 15 to both the top and the bottom portions of the tube 11. Further, the radial compression of the thermoelements as described insures the maintenance of low electrical resistance connections between the outer surface of said thermoelements and the inner surface of the coacting hot thermojunction rings 14 where this connection is of the pressure contact type. By virtue of the location of the re-entrant portion 16 of each cold thermojunction member 15 circumferentially outwardly beyond the outer ends of the coacting thermoelements together with the flexible nature of said thermojunction members, the elements of each thermocouple are self-alining independently of the adjacent thermocouples. Thus any relative radial displacement needed to aline the adjacent parts of one thermocouple can be achieved without any adverse effect upon the alinement of the parts of adjacent thermocouples.

In order to maintain proper spacial relationships and to prevent short circuiting between adjacent thermocouples, it is preferred to utilize insulating washers 20 (FIGURE 1), for example of mica, having an outer diameter the same as that of the rings 14. The washers 20 have portions 20a (FIGURES 1 and 2) interposed between the thermoelements of adjacent thermocouples, the inner diameter of said portions preferably corresponding to the outer diameter of the tube 11 as shown, the remaining portion 20b of said washers preferably having an inner diameter substantially the same as that of the rings 14. An insulating separator 21 (FIGURE 2) for example of mica, is also preferably disposed between adjacent end walls of the thermoelements 12 and 13 of each thermocouple.

It will be observed that the radial thickness of the thermoelements 12 and 13 is relatively short as compared to the circumferential length thereof in a circumferential direction. The materials of which the thermoelements 12 and 13 are made are preferably chosen from the P and N type lead telluride alloys disclosed in Robert W. Fritts and Sebastian Karrer Patent No. 2,811,571. The short radial length of the thermoelements 12 and 13 facilitates heat flow radially therethrough, and the high thermoelectric conversion efficiency of said thermoelements insures the generation of relatively large power output in response to large heat flux through the generator.

The thermopile structure thus far described is preferably enclosed within a jacket comprising a cylindrical wall 22 and annular end walls 23 and 24 which, together with the tube 11 form an hermetically sealed enclosure for said thermopile structure. Annular insulating washers 25 and 26, for example of mica, may be used to overlay the inner surfaces of the end walls 23 and 24 as shown. The walls 22, 23 and 24 are preferably formed of chromium stainless steel and at least the inner surface of the wall 23 is covered with an electrically insulating layer, for example an oxide layer, to prevent short circuiting of the rings 14 in contact therewith. Electrical connections to the terminal cold thermojunction members of the series circuit shown schematically in FIGURE 3 are made by conductors 27 and 28 which are brought out through suitable glass seals (not shown) in the end walls 23 and 24. To enhance the heat transfer through the device and also to provide a reducing atmosphere, it is preferred to have the hermetically sealed enclosure for the thermopile contain a gaseous fill of hydrogen under pressure.

Figure 4:
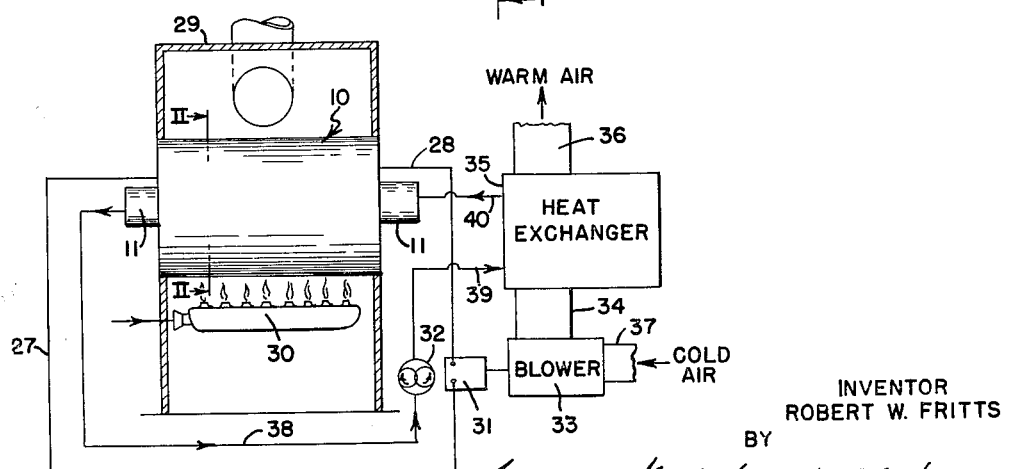
FIGURE 4 is a semi-diagrammatic view showing the improved generator embodied in a forced air heating system in which said generator provides the electrical energy for operation of a motor driving both a circulating water pump and a fresh air blower.

FIGURE 4 illustrates a forced air heating system in which the improved generator 10 is disposed within an enclosure 29 forming a combustion chamber for a gaseous fuel burner 30 disposed adjacent the underside of said generator. The conductors 27 and 28 connect the generator 10 to a motor 31 drivingly connected to a pump 32 and to a blower 33. The blower 33 forms part of a duct system 34 which also includes a heat exchanger 35. A warm air duct 36 leads from the heat exchanger 35 to a space to be heated and a cold air return duct 37 leads from said space to the inlet of the blower 33. One end of the tube 11 of the generator structure 10 is connected by a conduit 38 to the inlet of the pump 32, and a conduit 39 connects the outlet of said pump to the inlet of the liquid chamber of the heat exchanger 35. The outlet of the liquid chamber of the heat exchanger 35 is, in turn, connected by a conduit 40 to the other end of the conduit 11 of generator 10. The conduits 11, 38, 39 and 40, together with the liquid chamber of the heat exchanger 35 are filled with a heat transfer medium, for example a liquid such as water.

In the operation of the illustrated apparatus, heat produced by the burning of fuel at the burner 30 is applied directly to the lower external surface portions of the cylindrical enclosure wall 22 and may be transferred primarily by radiation to the thickened lower portions of the annular thermojunction and force transmitting members 14. The heat then flows radially through the thermoelements 12 and 13 and thermojunction members 15 to the resilient ring 17, from which said heat is conducted to the upper and lower portions of the conduit 11 contacted by members 17 for transfer to the medium within said conduit. It will be observed that the springs 19 are in good heat transfer relation with the conduit 11 through the upper portions of the rings 17, and are thermally insulated from the enclosure wall 22 by the porous ceramic insulator 18. These relationships place the springs 19 in a relatively cool environment insuring retention of the desired spring rate therein for the life of the generator 10.

The relatively large power output of the generator 10 is sufficient to effect operation of the motor 30 and thereby of the pump 32 and blower 33. The heat flows rapidly through the thermopile structure and, upon being transferred to the heat transfer medium within the conduit 11, is circulated by the pump 32 to the heat exchanger 35 wherein said heat is transferred to the air circulated through the duct system 34 by operation of the blower 33. In the disclosed system, the speed of the motor 31 inherently modulates in accordance with the size of the flame at the burner 30. Thermostatic or other control means therefor may, however, be provided as suitable and desired.

While a forced air heating system is disclosed in FIGURE 4, it will be apparent to those skilled in the art that the conduit 11 of the generator 10 may, if desired, be connected directly into the circulating system of a hot water circulating type furnace. The specific generator structure 10 disclosed was selected to facilitate an understanding of the invention and is not intended to limit the number of forms which the invention may take or to confine the invention to a particular use. Various changes and modifications may be made in the disclosed generator structure without in any way departing from the spirit of the invention, and all of such changes are contemplated as may come within the scope of the appended claims.

What is claimed as the invention is:

1. In a thermoelectric device, the combination of an annular wall, a ring substantially concentrically surrounding said wall; thermoelectric means disposed in the radial space between said ring and said annular wall at one side thereof, and biasing means interposed between said annular wall and said ring at the opposite side thereof biasing said ring away from said annular wall thereat to thereby compressively stress said thermoelement means between said ring and annular wall.

2. A thermoelectric generator comprising an annular wall, a pair of thermoelements at one side thereof, thermojunction means including a metal ring substantially concentrically surrounding said wall and disposed outwardly of said thermoelements, said thermojunction means electrically joining said thermoelements, and biasing means interposed between said annular wall and said ring at the opposite side thereof biasing said ring away from said annular wall thereat to thereby compressively stress said thermoelements between said ring and annular wall.

3. A thermoelectric generator comprising an annular wall, a metal ring substantially concentrically surrounding said wall; a pair of thermoelements disposed in the radial space between said ring and said annular wall at one side thereof, said ring affording thermojunction means electrically joining said thermoelements, and biasing means interposed between said annular wall and said ring at the opposite side thereof biasing said ring away from said annular wall thereat to thereby compressively stress said thermoelements between said ring and annular wall.

4. In a thermoelectric device, the combination of an annular wall, a metal first ring substantially concentrically surrounding said wall; arcuate thermoelement means disposed in and conforming generally to the radial space between said ring and said annular wall at one side thereof, a resilient metal second ring having a larger diameter than said annular wall surrounding the latter and interposed between said thermoelements and said annular wall, and biasing means interposed between said second ring and said first ring at the opposite side thereof biasing said first ring away from and said second ring toward said annular wall thereat to thereby compressively stress said thermoelement means between said first and second rings as well as to deform said resilient second ring into engagement with said annular wall at both said one and opposite sides, said deformation insuring maximum area of thermal contact between said second ring and said thermoelement means.

5. A thermoelectric generator comprising an annular wall, a metal first ring substantially concentrically surrounding said wall; a pair of arcuate thermoelements disposed in and conforming generally to the radial space between said ring and said annular wall at one side thereof, said first ring affording outer thermojunction means electrically joined to the arcuate outer surfaces of said thermoelements, arcuate inner thermojunction members overlaying and electrically joined to the inner arcuate surfaces of said thermoelements, a resilient metal second ring having a larger diameter than said annular wall surrounding the latter and interposed between said inner thermojunction members and said annular wall, and biasing means interposed between said second ring and said first ring at the opposite side thereof biasing said first ring away from said second ring toward said annular wall thereat to thereby compressively stress said thermoelements and inner thermojunction members between said first and second rings as well as to deform said resilient second ring into engagement with said annular wall at both said one and opposite sides thereof, said deformation insuring maximum area of thermal contact of said second ring with said annular wall and said inner thermojunction members.

6. A thermoelectric generator comprising a pair of spaced similarly shaped arcuate thermoelements disposed in side-by-side relation and having arcuate inner and outer surfaces, and thermojunction means comprising a U-shaped metallic member having arcuate leg portions overlaying one of said arcuate surfaces of each of said thermoelements, means effecting and maintaining electrical joinder of said arcuate leg portions and said thermoelements, said member having a flexible re-entrant portion extending beyond one end of said thermoelements and affording an electrical connection permitting relative movement between said thermoelements.

7. A thermoelectric generator comprising a metal conduit, a plurality of similar metal rings substantially concentrically surrounding said conduit in spaced side-by-side relation, a pair of thermoelements disposed in the radial space between each of said rings and said conduit at one side thereof, said rings affording thermojunction means electrically joined to the outer end surfaces of the thermoelements therewithin, thermojunction means electrically joined to the inner end surfaces of said thermoelements and affording with said rings series circuit connection of said thermoelements, and biasing means interposed between said rings and said conduit at the opposite side thereof biasing said rings away from said conduit thereat to compressively stress said thermoelements between said conduit and rings.

8. A thermoelectric generator comprising a metal conduit, a plurality of similar metal rings substantially concentrically surrounding said conduit in spaced side-by-side relation, a pair of arcuate thermoelements having arcuate inner and outer surfaces and disposed in the radial space between each of said rings and said conduit at one side thereof, said rings affording thermojunction means electrically joined to the arcuate outer surfaces of the thermoelements therewithin, thermojunction means comprising a plurality of U-shaped metallic members having leg portions overlaying and electrically joined to the inner arcuate surfaces of adjacent thermoelements, said members each having a flexible re-entrant portion extending beyond one end of said thermoelements and affording an electrical connection permitting relative movement between the thermoelements connected thereby, said U-shaped members affording, with said rings, series circuit connection of said thermoelements, and biasing means interposed between said rings and said conduit at the opposite side thereof biasing said rings away from said conduit thereat to compressively stress said thermoelements between the respective U-shaped members and rings associated therewith.

9. In a thermoelectric device, the combination of a metal conduit, a plurality of similar metal first rings substantially concentrically surrounding said conduit in spaced side-by-side relation, arcuate thermoelement means disposed in and conforming generally to the radial space between each of said rings and said conduit at one side thereof, a plurality of resilient metal second rings each having a larger diameter than said conduit and surrounding the latter, one of said second rings being interposed between the thermoelement means and said conduit within each of said first rings, and biasing means interposed between said first and second rings at the opposite side thereof biasing said first rings away from and said second rings toward said conduit thereat to thereby compressively stress said thermoelement means between said first and second rings as well as to deform said resilient second rings in engagement with said conduit at both said one and opposite sides thereof, said deformation insuring maximum area of thermal contact of said second rings with said conduit and said thermoelement means.

10. A thermoelectric generator comprising a metal conduit, a plurality of similar metal first rings substantially concentrically surrounding said conduit in spaced side-by-side relation, a pair of arcuate thermoelements having arcuate inner and outer surfaces and disposed in and conforming generally to the radial space between each of said rings and said conduit at one side thereof, said first rings affording thermojunction means electrically joined to the arcuate outer surfaces of the thermoelements therewithin, thermojunction means comprising a plurality of U-shaped metallic members having leg portions overlaying and electrically joined to the inner arcuate surfaces of adjacent thermoelements, said members each having a flexible re-entrant portion extending beyond one end of said thermoelements and affording an electrical connection permitting relative radial movement between the thermoelements connected thereto, said U-shaped members affording, with said first rings, series circuit connection of said thermoelements, a plurality of resilient metal second rings each having a larger diameter than said conduit and surrounding the latter, one of said second rings being interposed between each U-shaped member leg and said conduit, and a plurality of springs respectively interposed between the first and second rings associated with each pair of thermoelements at the opposite side thereof biasing said first rings away from and said second rings toward said conduit thereat to thereby compressively stress said thermoelements and said U-shaped member legs between said first and second rings as well as to deform said resilient second rings into engagement with said conduit at both said one end and said opposite sides thereof, said deformation insuring maximum area of thermal contact of said second rings with said conduit and said U-shaped member legs.

11. A thermoelectric generator comprising a metal conduit, a plurality of similar metal first rings substantially concentrically surrounding said conduit in spaced side-by-side relation, a pair of arcuate thermoelements having arcuate inner and outer surfaces and disposed in and conforming generally to the radial space between each of said rings and said conduit at one side thereof, said first rings affording thermojunction means electrically joined to the arcuate outer surfaces of the thermoelements therewithin, thermojunction means comprising a plurality of U-shaped metallic members having leg portions overlaying and electrically joined to the inner arcuate surfaces of adjacent thermoelements, said members each having a flexible reentrant portion extending beyond one end of said thermoelements and affording an electrical connection permitting relative radial movement between the thermoelements connected thereto, said U-shaped members affording, with said first rings, series circuit connections of said thermoelements, a plurality of resilient metal second rings each having a larger diameter than said conduit and surrounding the latter, one of said second rings being interposed between each U-shaped member leg and said conduit, a plurality of springs respectively interposed between the first and second rings associated with each pair of thermoelements at the opposite side thereof biasing said first rings away from and said second rings toward said conduit thereat to thereby compressively stress said thermoelements and said U-shaped member legs between said first and second rings as well as to deform said resilient second rings into engagement with said conduit at both said one and said opposite sides thereof, said deformation insuring maximum area of thermal contact of said second rings with said conduit and said U-shaped member legs, means forming with said conduit an hermetically sealed annular enclosure for said generator, and a gaseous fill of hydrogen under pressure within said enclosure.

12. A thermoelectric generator comprising an enclosure adapted to be subjected to a source of heat, passage means within said enclosure adapted to have a heat transfer medium circulate therethrough, thermoelement means disposed within said enclosure and having outer and inner thermojunction members electrically joined thereto, said outer and inner thermojunction members being disposed in heat transfer relation with said enclosure and passage means respectively, one of said outer thermojunction members encircling said passage means and at least two of said thermoelement means, biasing means including spring means coacting with said one outer thermojunction member to place the thermoelement means associated therewith under compression and to place the inner thermojunction member joined to said associated thermoelement means in heat transfer relation with said passage means.

References Cited in the file of this patent

UNITED STATES PATENTS

| | | |
|---|---|---|
| 2,919,553 | Fritts | Jan. 5, 1960 |
| 2,959,925 | Frantti et al. | Nov. 15, 1960 |

FOREIGN PATENTS

| | | |
|---|---|---|
| 18,990 | Great Britain | June 5, 1913 |
| 540,886 | France | Sept. 15, 1955 |